(12) United States Patent
MacInnis

(10) Patent No.: US 6,487,723 B1
(45) Date of Patent: Nov. 26, 2002

(54) MULTICAST DOWNLOADING OF SOFTWARE AND DATA MODULES AND THEIR COMPATIBILITY REQUIREMENTS

(75) Inventor: Alexander G. MacInnis, San Carlos, CA (US)

(73) Assignee: Scientific-Atlanta, Inc., Lawrenceville, GA (US)

( * ) Notice: Subject to any disclaimer, the term of this patent is extended or adjusted under 35 U.S.C. 154(b) by 0 days.

(21) Appl. No.: 09/305,179

(22) Filed: May 4, 1999

Related U.S. Application Data

(62) Division of application No. 08/601,455, filed on Feb. 14, 1996, now Pat. No. 5,951,639.

(51) Int. Cl.[7] .................. G06F 15/16; G06F 15/177; H04N 7/20; H04N 7/173
(52) U.S. Cl. .................. 725/132; 725/68; 725/70; 725/87; 725/97; 725/109; 725/110; 709/219; 709/220
(58) Field of Search .................. 725/97, 87, 109, 725/110, 68, 70, 132; 709/217, 220

(56) References Cited

U.S. PATENT DOCUMENTS 5,495,610 A * 2/1996 Shing et al. .................. 709/220
5,666,293 A * 9/1997 Metz et al. .................. 709/220

* cited by examiner

Primary Examiner—Andrew Faile
Assistant Examiner—Jason Salce
(74) Attorney, Agent, or Firm—Kenneth M. Massaroni; Hubert J. Barnhardt, III; Shelley L. Couturier

(57) ABSTRACT

A system for downloading different versions of software or data modules into a plurality of terminals having different compatibility interfaces includes an authoring component for generating the different module versions, a downloading source including a descriptor table which associates each module version with a list of compatibility requirements needed to download the module, and a plurality of terminals coupled to the downloading source. The downloading source transmits the descriptor table to each terminal and also continuously transmits the modules over the network. Each terminal extracts the descriptor table and, based on a match between an entry in the descriptor table and an internally stored table, determines which version of a particular module should be downloaded. The system avoids the need for two-way communication between each terminal and the downloading source.

18 Claims, 6 Drawing Sheets

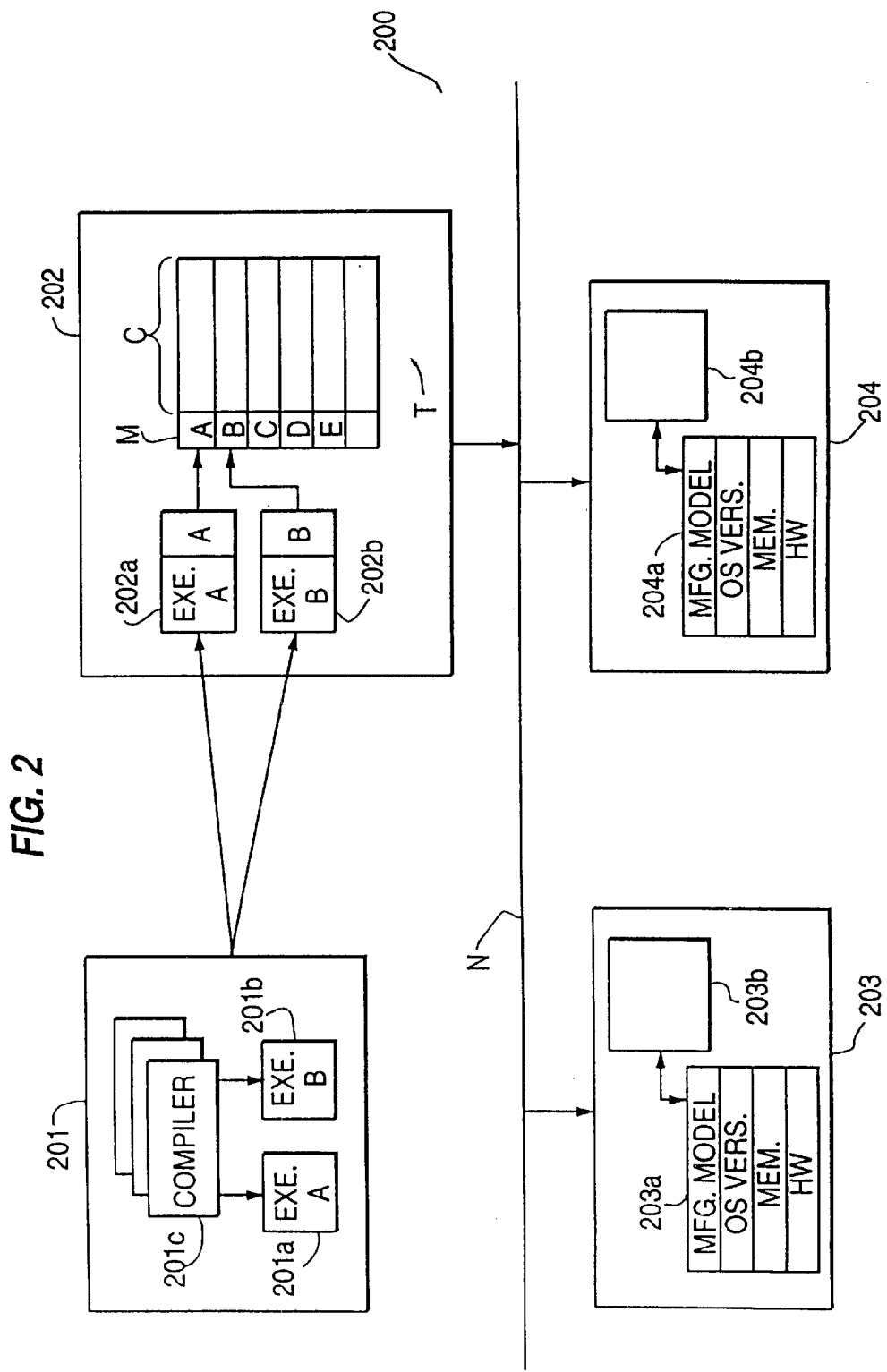

MULTICAST DOWNLOADING OF SOFTWARE AND DATA MODULES AND THEIR COMPATIBILITY REQUIREMENTS

This application is a divisional of application Ser. No. 08/601,455 filed Feb. 14, 1996, now U.S. Pat. No. 5,951,639.

BACKGROUND OF THE INVENTION

1. Technical Field

This invention relates generally to systems for downloading software and data modules into terminals over a network, such as home communication terminals (HCTs) in a cable television network. More specifically, the invention provides an apparatus and method for selectively downloading different versions of software modules and data modules to a variety of potentially different terminal types, where the differences may be due to variations in hardware, operating system versions, or other parameters.

2. Related Information

Systems capable of downloading computer software into terminals such as HCTs in a subscription television system are well known. For example, U.S. Pat. No. 5,440,632, entitled "Reprogrammable Subscriber Terminal", describes a system including means for reprogramming subscriber terminals by downloading code in a series of transactions. Such systems can be used to add new applications, or to replace outdated or faulty software. Difficulties and inefficiencies may arise, however, in networks having different types of terminals which require different versions of software.

For example, in a cable television network, some subscribers may have the newest HCT model with fast processors, special peripherals and extra memory, while other subscribers may have older HCTs which do not have such interfaces or capabilities. Additionally, some HCTs may be loaded with the latest version of an operating system, while others may be compatible only with older versions of the operating system. Similarly, HCTs from different suppliers with different designs generally require different versions of software. In such systems, multiple versions of software and data must be downloaded. Thus arises a problem in determining which versions of particular modules should be downloaded into each terminal, and providing an efficient scheme for doing so.

One possible method for solving the aforementioned problem is to provide each terminal with means for requesting only a particular version of a module from the headend. Unfortunately, such a scheme requires two-way communication between the terminals and the headend, which may be expensive and inefficient to provide, particularly since each terminal would require, at least temporarily, a dedicated channel for transmitting the requested version of the software or data.

Other downloading schemes involving client-server paradigms in a network environment are also known. For example, in a network comprising a server and a plurality of clients, any particular client on the network requiring a new or updated software module can download such software by making a request to the server, which provides the requested version over the network. However, as noted above, in networks such as subscription television systems, such two-way communication may be expensive and difficult to provide, and may result in increased complexity and reduced download performance. Furthermore, it may be difficult to coordinate version numbers among different software applications, complicating the task of determining which versions of complementary software should be downloaded into a particular terminal.

Finally, systems which require communication between the downloading source and each terminal impose additional processing requirements upon the downloading source and on the terminal. In a network comprising hundreds of thousands of terminals and a single downloading source, such added processing can slow down the system unacceptably.

The above-described problems will likely worsen as the variety of HCTs expands to provide consumers with a wider range of terminals of varying capabilities and prices, and from multiple suppliers with different designs.

Accordingly, in order to overcome the above and other difficulties, a means of selectively downloading software and data modules without requiring two-way client-server communication is desirable. To date, no such suitable approach has been developed.

SUMMARY OF THE INVENTION

The present invention solves the aforementioned problems by providing a system and method for selectively downloading software and data modules to terminals in a network without requiring communication between the terminal and the downloading source. The term "modules" as used herein includes application programs, subparts of programs, operating systems, "patches", data tables, groups of interpretable instructions, and the like.

According to various aspects of the invention, an authoring source generates a plurality of module versions according to different terminal configurations, operating system versions, or other hardware parameters such as memory size. Each different module version has accompanying descriptor information which identifies the compatibility requirements and/or interfaces needed to support the module. A transmitting (downloading) source such as a headend facility transmits, to a plurality of terminals, descriptors which correlate each module version with its required interfaces. Each terminal receives the transmitted descriptors and, by comparing the descriptors with an internal configuration table, selects the "best" module version for that terminal. The actual module may be downloaded in a "carousel" channel which continuously broadcasts all the various versions of modules in a loop, or it may be downloaded by other means such as an in-band channel.

According to another aspect of the invention, each terminal may automatically extract the descriptors upon boot-up to automatically find the most recent version of the operating system to be downloaded for the terminal.

According to yet another aspect of the invention, each terminal may extract the descriptors after a user selects an application program.

Other features and advantages will become apparent through the following detailed description, the drawings, and the appended claims.

BRIEF DESCRIPTION OF THE DRAWINGS

FIG. 2 depicts a system employing various principles of the invention including an authoring source 201, a transmitting source 202, and a plurality of terminals 203 and 204 for receiving module descriptors.

DETAILED DESCRIPTION OF THE PREFERRED EMBODIMENTS

Figure 1:
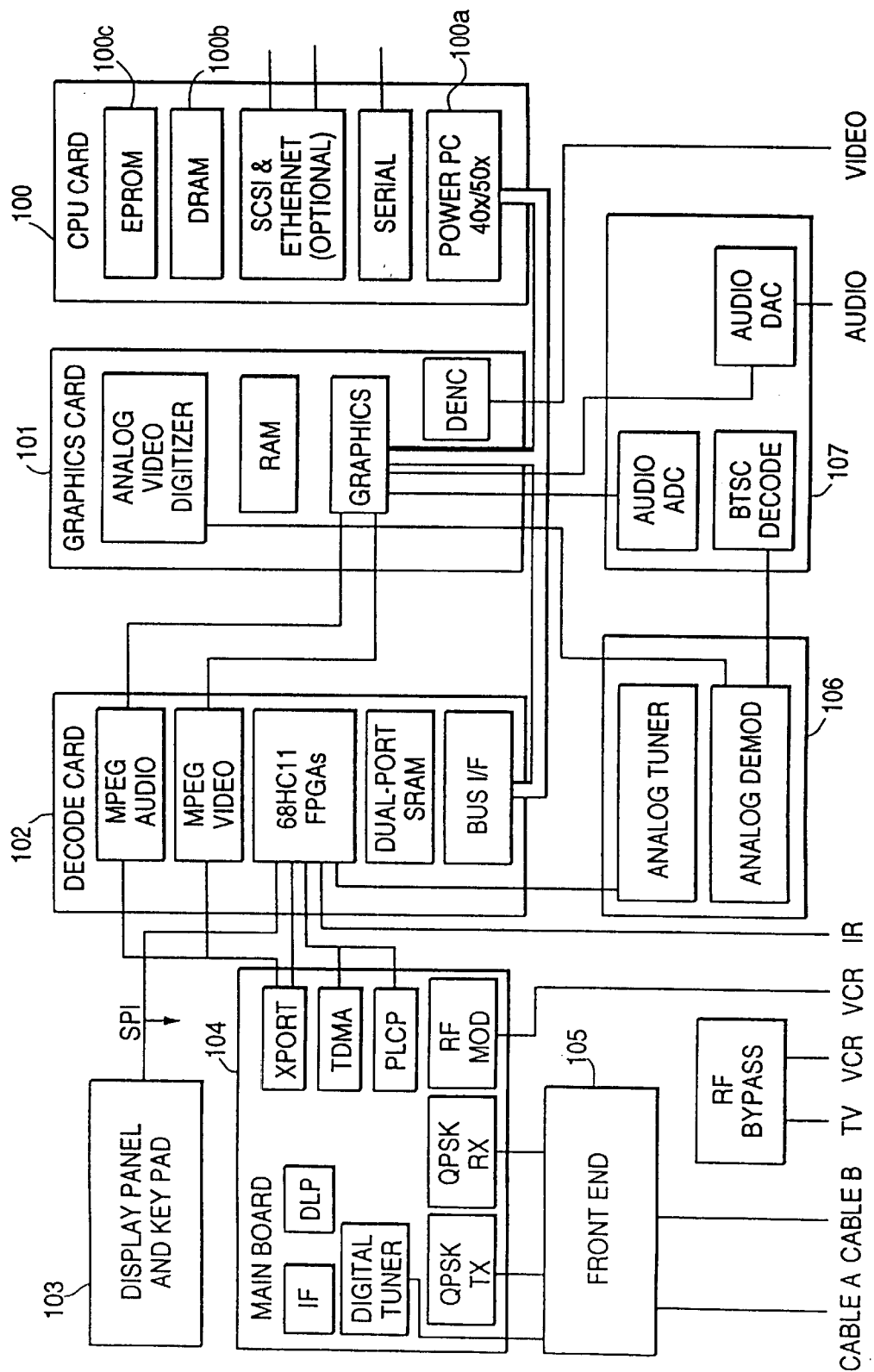
FIG. 1 shows one possible configuration for a home communication terminal (HCT) on which various principles of the present invention may be practiced.

FIG. 1 shows a block diagram of a home communication terminal (HCT) which may be used to practice various principles of the present invention. The HCT may include a CPU card 100, graphics card 101, decoder card 102, display panel and key pad 103, main processing board 104, front end 105, tuning section 106, and audio section 107. It is contemplated that the inventive principles may be practiced using any suitable CPU 100a such as a PowerPC or Motorola 68000 series, with suitable EPROM 100c and RAM 100b. It is also contemplated that application programs executing on CPU 100a can interact with various peripherals such as a mouse, game controllers, keypads, network interfaces, and the like, as is well known in the art. In summary, any particular HCT may comprise a variety of hardware components, but different HCTs may be equipped with different compatibility requirements such as memory sizes, processor types, audio capabilities, operating system versions, interfaces, and the like.

FIG. 2 shows a system for downloading different module versions to diverse HCTs in accordance with various aspects of the invention. In FIG. 2, the system 200 includes an authoring source 201, a transmitting source 202 such as a headend, a network N such as a cable television network, and a plurality of terminals 203 and 204 such as HCTs which are coupled to the network. In accordance with various aspects of the invention, authoring source 201 may comprise one or more compilers, assemblers, loaders, debuggers and so forth represented by 201c. Using these tools, a plurality of modules indicated generally by 201a and 201b may be generated, corresponding to different application programs, different versions of the same application program, tuning tables, program guides, other data tables, and the like.

As one example, module 201a may comprise an executable video game program compatible with HCTs which include at least 500 kilobytes of memory, while module 201b may comprise a more elaborate version of the same program which requires at least 1 megabyte of memory (for example, it may include more sophisticated graphics or provided additional colors). While it is apparent that module 201a may operate in HCTs configured to contain either 500 kilobytes or 1 megabyte, it is also apparent that module 201b can only operate properly in HCTs configured to contain at least 1 megabyte of memory.

In accordance with various embodiments of the invention, each module 201a and 201b may be provided to transmitting source 202 and associated with a module identifier. For example, module 202a is associated with a module identifier A which identifies it, while module 202b is associated with a module identifier B which identifies it. A compatibility requirement table T comprises entries each including a module identifier M and a list of compatibility requirements C which identify compatibility interfaces and/or capabilities required in a terminal in order for that terminal to download that module.

Continuing with the example in FIG. 2, suppose that module 202a is a video game which requires 500 kilobytes of memory in an HCT, while module 202b is another version of the same video game which requires 1 megabyte of memory to operate (e.g., suppose it has enhanced graphics as compared to module 202a). Thus, module 202a may have a module identifier such as "Video Game X" (represented by A in table T) while module 202b may have the same or a similar module identifier such as "Video Game X" (represented by B in table T). Each module identifier preferably includes location information which allows the module to be located in a data stream, for example. Alternatively, the location information may be separately stored in table T or derived by other means.

Associated with each module identifier in table T is a list of compatibility requirements C which identifies the requirements needed to download and execute (or use) the specified module. For example, the entry for module A would include a field indicating that the module requires 500 kilobytes of memory to execute, while the entry for module B would indicate 1 megabyte in this field.

In accordance with various embodiments of the invention, portions of table T are transmitted continuously from transmitting source 202 over network N to terminals 203 and 204. Thus, each terminal receives a list of all modules, their compatibility interface requirements, and the location where each module may be found (e.g., an address in a data stream such as an MPEG transport stream, or a combination of data stream ID and identification number such as packet and table identifiers within the stream). Each terminal also has its own internal table which identifies its own capabilities and/or compatibility interfaces. By matching the downloadable module requirements with its own internal capabilities, each terminal can determine what version of the video game application to download and where to find it, such as the location within a data carousel or other structure. The actual downloading procedure may be accomplished by selectively extracting the module from a separate channel on which transmitting source 202 continuously broadcasts all versions of all the modules in a loop, or by other means. In accordance with the foregoing, each terminal may download the correct version of software and/or data from transmitting source 202 without making a request to source 202.

As shown in FIG. 2, each terminal may include an internal table such as table 203a in terminal 203. Table 203 may identify the manufacturer's model number of the terminal, the version number of the currently executing operating system, the amount of memory currently installed, and the current hardware configuration (for example, interface type such as Ethernet, etc.).

Other fields may also be included, such as CPU RAM (indicating the amount of optional CPU memory installed), CPU flash (indicating the amount of optional CPU flash memory installed), MPEG RAM (indicating the amount of MPEG video decoder memory installed), graphics RAM (indicating the amount of graphics RAM installed), available CPU RAM (the amount of available CPU memory installed, or largest loadable block), or the like.

If a terminal is upgraded to include additional memory or other capabilities, the terminal's internal table would be correspondingly updated.

Figure 3A:
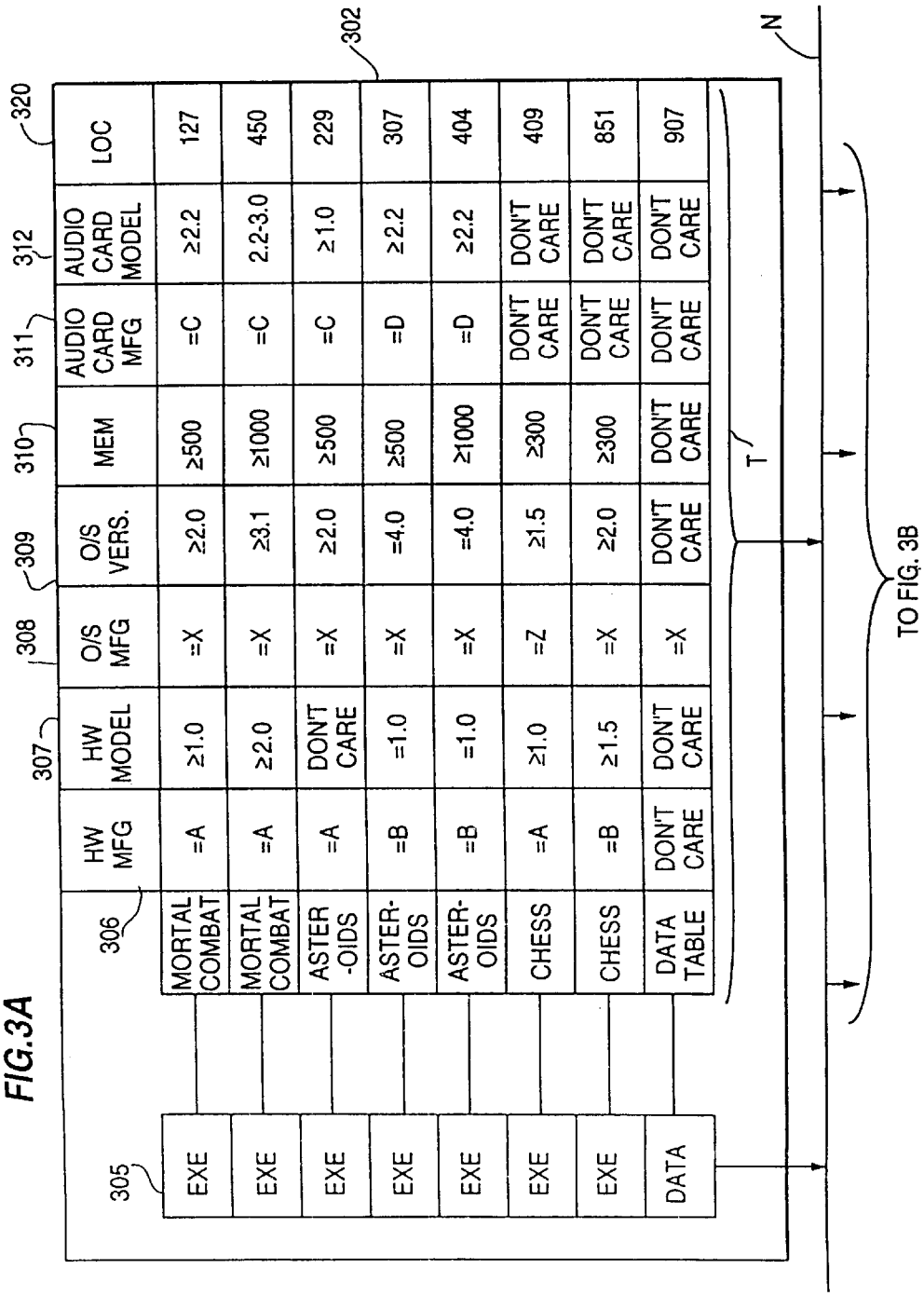
FIG. 3 shows in more detail how information regarding different module versions may be maintained in a table T and transmitted to a plurality of terminals, each of which maintains an internal table describing its compatibility requirements.
Figure 3B:
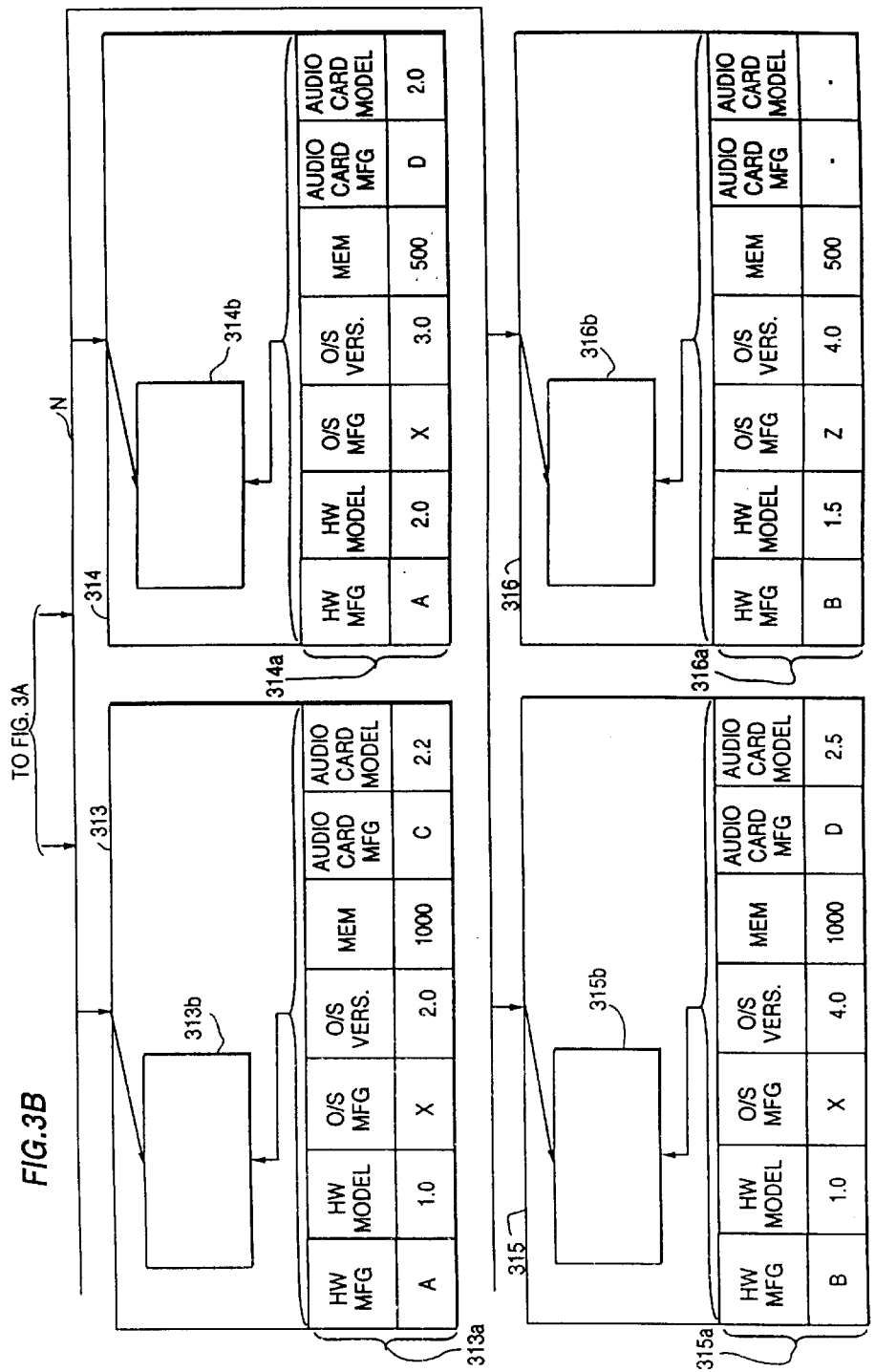

FIG. 3 shows in additional detail how entries in compatibility requirements table T may be configured to describe the terminal capabilities required to download each module from downloading source 302. The term "module descriptors" as used herein refers to the group of compatibility requirements associated with a particular version of a module. Compatibility requirements table T thus correlates module identifiers (and their addresses) with capabilities required to download the module. Each of the actual modules is preferably associated with a module identifier in table T, which is in turn associated with module descriptors. Other arrangements are of course possible, and the table configuration shown in FIG. 3 is not intended to be limiting. Entries could of course be combined or associated in ways other than that specifically illustrated.

As shown in FIG. 3, each module can have associated therewith descriptors for a hardware manufacturer 306, hardware model number 307, operating system manufacturer 308, operating system version 309, memory capacity 310, audio or other type of card manufacturer 311, and audio or other type of card model number 312. Additionally, location information 320 may be associated with each module to indicate the location from which the module may be downloaded (for example, a channel number with other associated parameters, an MPEG stream number, or the like). The descriptors shown in FIG. 3 are intended to be exemplary and in no way limiting. More or fewer descriptors could of course be included, such as network subsystems, encoding/decoding options, encryption/decryption options, modulation techniques, data formats, and the like.

As shown in FIG. 3, for example, two versions of a video game application known as "Mortal Combat" are shown, each having different module descriptors. In order to download the first version of "Mortal Combat", a terminal must be compatible with hardware manufacturer A, model number greater than or equal to 1.0, must be executing an operating system manufactured by company X having a version number of 2.0 or greater, must have at least 500 kilobytes of memory, and must have an audio card manufactured by manufacturer C with a model number of 2.2 or greater. If a terminal in the system meets all these requirements, it is assured that the indicated version of the application is compatible with the terminal. If, however, any one of the capabilities in the list fails to match the terminal's capabilities, the application is presumed to be not compatible with the terminal.

The second entry, also indicated as "Mortal Combat", has similar compatibility requirements, but requires a higher hardware model number (2.0 or greater), a higher operating system version (3.1 or greater), at least 1 megabyte of memory, and an audio card within a range of audio cards manufactured by C (e.g., models 2.2 through 3.0).

Similarly, three versions of a video game entitled "Asteroids" are described in table T, including versions which can operate across different terminal hardware manufacturers, operating system manufacturers, and audio cards. Two versions of a chess video game are also shown, neither of which requires an audio card (note "Don't Care" entries). The final entry depicts a data table which can be downloaded by any terminal which includes an operating system manufactured by X; no other capabilities or interfaces are required.

One or more fields may be included in table T which specify how the comparison between module descriptors and terminal capabilities is to be carried out. For example, a field can be included which, when set to a first value, indicates that the model and version number of the terminal must exactly match the model number and version number of the module; when set to a second value, indicates that the model numbers must match exactly but that the module operating system version number must be equal to or greater than the version number of the terminal; when set to a third value, indicates that both the model number and operating system version numbers of the terminal must be equal to or greater than the model number and version number of the module. Other variations are of course possible. As shown in FIG. 3, for example, the comparison qualifiers are illustrated as being combined with the compatibility requirement values in each field.

A plurality of modules may be concatenated into a data stream 305 which is continuously transmitted on a "carousel" type channel, such as an out-of-band channel or an in-band channel (indeed, the same transmission channel could be used to transmit the descriptor table T). Other techniques of transmitting data containing the downloadable modules are of course possible, and the invention is not intended to be limited in this respect.

Four terminals 313 through 316 are illustrated in FIG. 3 as being coupled to network N. In accordance with various aspects of the invention, table T may be transmitted continuously over network N to all terminals, which receive the table and extract information therefrom to determine which modules are compatible with the terminal. In order to accomplish this, each terminal includes an internal table such as table 313a including entries which at least overlap with entries in table T. A computer program or other mechanism 313b receives table T from the transmitting source 302 and compares entries in table T with the entry in the internal table for that terminal in order to select a compatible software module to be downloaded.

Each terminal may extract information from table T at boot-up time, or upon initiation of a particular program, or at any other time. For example, each terminal may operate mechanism 313b upon boot-up to determine whether a newer version of the operating system is available for downloading. (In such a case, the operating system version entry in table T would not be compared, since the module to be downloaded is the operating system itself, and, as such, it does not require the previously loaded operating system for compatibility with the terminal).

As depicted in FIG. 3, terminal 313 includes an internal table 313a which indicates that the terminal is presently configured as being manufactured by hardware manufacturer A, model 1.0, and executing an operating system manufactured by X, version 2.0. Additionally, terminal 313 includes 1 megabyte of memory and audio card model 2.2 manufactured by manufacturer C. Terminals 314 through 316 include similar tables. Note that terminal 316 does not have an audio card.

Suppose that the user of terminal 313 selects the video game "Mortal Combat", which is not currently resident in terminal 313. In accordance with the invention, download mechanism 313b extracts descriptor table T from the network and locates the two versions of the requested "Mortal Combat" video game in the table. By comparing the two version descriptors with the compatibility requirements of terminal 313, terminal 313 determines that only the first version of the game can be downloaded, because the second version requires a hardware model number of 2.0 or greater, which is not compatible with the entries in table 313a. Accordingly, because the terminal entry in table 313a satisfies the criteria described in the first entry of table T, it can and does download that version of "Mortal Combat" from module data stream 305, without requiring any requests to downloading source 302. Thus, no communication is required between terminal 313 and downloading source 302 to identify and coordinate the downloading of the correct version of a video game. Terminal 313 can extract the proper version of "Mortal Combat" by virtue of an association between its module name in table T with an address in data stream 305.

As another example, suppose that terminal 315 needs to download the video game "Asteroids". Of the three versions of "Asteroids" included in table T, the first version cannot be downloaded by terminal 315 because it is only compatible with terminals manufactured by manufacturer A. However, either of the second two versions would be compatible with the requirements included in table 315a, the only difference being that the second version requires only 500 kilobytes to be downloaded, while the third version requires 1 megabyte. In accordance with various aspects of the invention, terminal mechanism 315b may select the "best" version, which would presumably correspond to the 1 megabyte version (i.e., it is the version having the highest degree of match).

As yet another example, note that any of terminals 313, 314 and 315 may download the data table (last entry in table T), but that terminal 316, which executes an operating system manufactured by manufacturer Z, is not compatible with the data table. Thus, it is apparent that each terminal can select for itself—without communicating to downloading source 302—which of several versions of a software or data module can be downloaded into that terminal.

Figure 4:
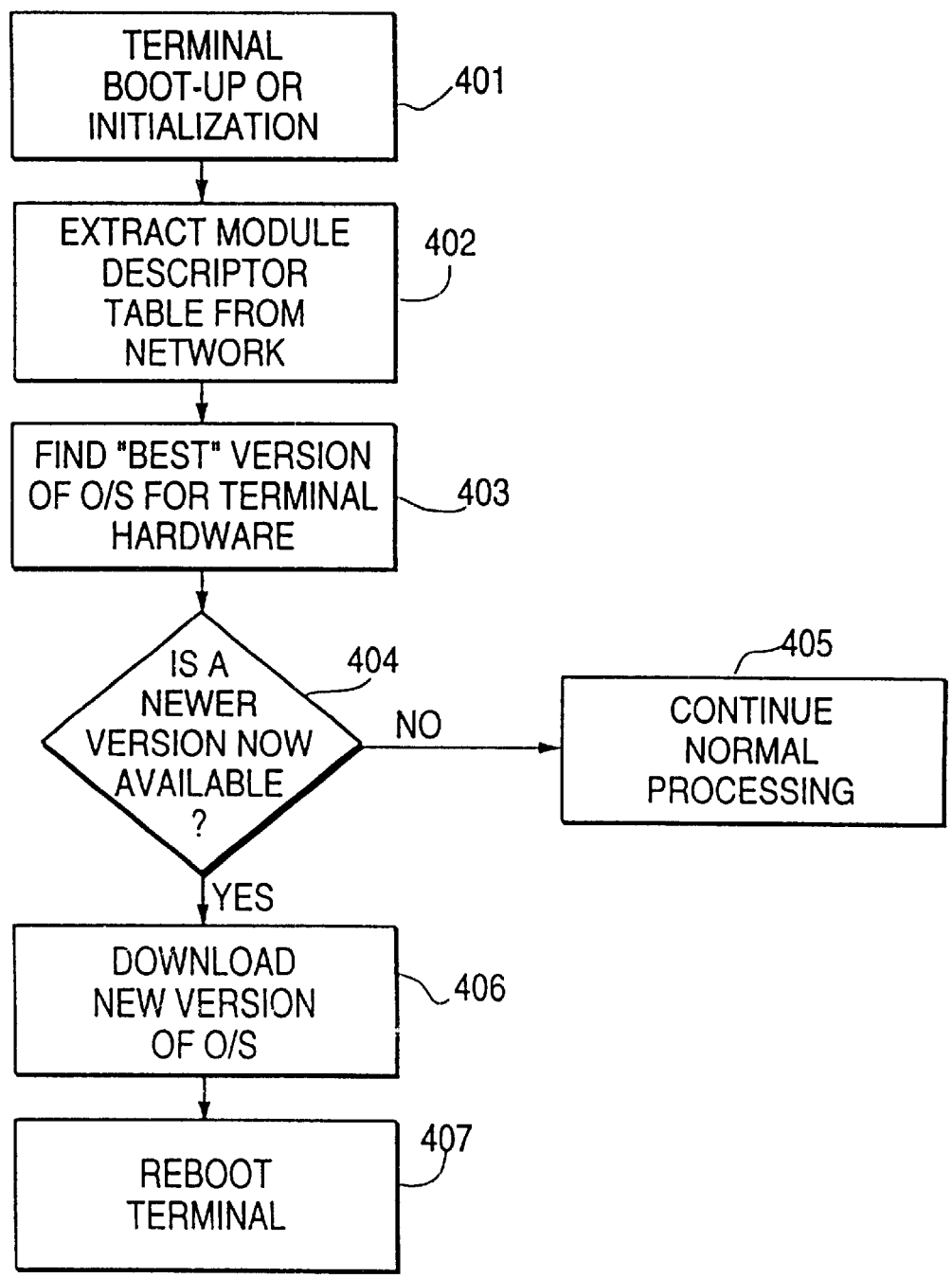
FIG. 4 shows various steps which may be carried out in each terminal to download the latest version of an operating system into a terminal upon boot-up.

FIG. 4 shows steps which may be executed by each terminal in order to automatically upgrade the operating system to the latest version upon boot-up or other initialization sequence. Beginning in step 401, the terminal boots up or otherwise commences an initialization sequence. This could occur upon power-up, for example, or upon receiving a command from the network.

In step 402, the terminal receives the module descriptor table from the network from a known channel and location. In step 403, the terminal compares all the operating system modules in the received descriptor table which are compatible with the particular hardware configuration of the terminal (e.g., it matches terminal manufacturer, model, operating system manufacturer, and memory). Based on the comparison between the operating system modules in the received table and the hardware parameters in its internal configuration table, the terminal finds the highest operating system version number which is compatible with the terminal's hardware parameters.

In step 404, a comparison is made between the highest compatible operating system version number available in the received descriptor table and the currently executing operating system version number in the terminal. If the highest available operating system version is less than or equal to the version currently executing in the terminal, then in step 405 the terminal continues its normal processing. However, if a newer (higher) version of the operating system is available, in step 406 the terminal downloads the newer version from the download data stream, and reboots the terminal in step 407 to install the newer version. The downloading in step 406 can be accomplished by tuning to a "carousel" channel and locating the newest operating system version according to its address in the data channel (the module address can be extracted from the descriptor table).

In step 404, instead of determining whether a newer version of the operating system is available, the terminal could instead make a determination that the currently loaded operating system is corrupted or otherwise not suitable. In such a circumstance, the terminal could automatically obtain the latest version of the operating system by locating and downloading it from the data stream. Instructions to execute the steps shown in FIG. 4 could be installed into ROM to prevent erasure or corruption.

Figure 5:
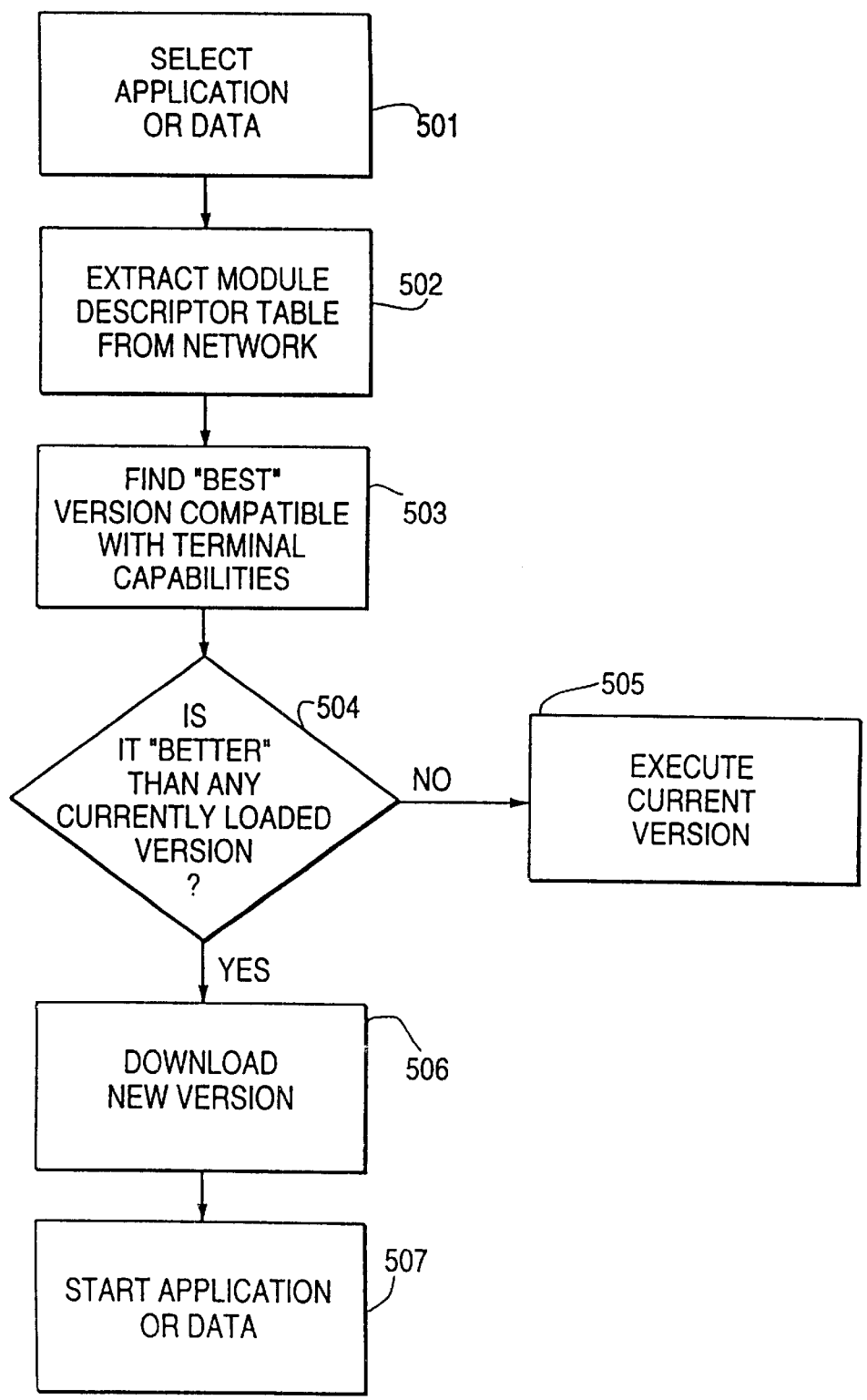
FIG. 5 shows various steps which may be carried out in each terminal to download a compatible module into the terminal using the transmitted descriptors.

FIG. 5 shows how a terminal may download an application module or data module in response to selecting an application, whether by user input or other means (e.g., the operating system may select a program or data table for a purpose). Beginning in step 501, an application module (such as a video game, a stock market tool, a billing program, or the like) or a data module (such as a tuning table, operating system parameter table, screen icon or the like) is selected. In step 502, the terminal extracts the module descriptor table from the network at a known channel and location. In step 503, the terminal finds the "best" version of the selected application or data module in the received descriptor table which is compatible with the terminal's capabilities and interfaces. This may include checking all of the fields shown in FIG. 3, a subset of these fields, or additional fields.

In step 504, a comparison is (optionally) made between the "best" located version of the selected module and any currently loaded version (if any) of the module in the terminal. If a currently loaded version of the module is already the "best" version for the terminal, then in step 505 the currently loaded version is executed. However, if a newer version (or a version not currently loaded) is available, then in step 506 the specified version of the module is downloaded from the network. Thereafter, in step 507, the application is executed or the downloaded data module is accessed.

In step 501, instead of an application or data module being "selected", the terminal may perform an equivalent step by terminating an existing application. Thus, for example, if a "navigator" program is normally executed by the terminal to allow a user to select from among a group of applications, then at the completion of any particular application, the terminal could automatically execute the steps shown in FIG. 5 to determine if a newer version of the navigator program were available. Such a case might occur where new features were added to a main menu, for example. Additionally, although not explicitly shown in FIG. 5, the terminal could free up memory areas if needed before downloading newer modules.

It is apparent that many modifications and variations of the present invention are possible, and references to specific values are by example only. As one example, the module descriptors and download data stream could be transmitted periodically, continuously, or a periodically, using either in-band techniques, out-of-band techniques, or over a combination of channels. Either the module descriptor table, the downloaded modules, or both, could be compressed, encoded, encrypted, or otherwise manipulated prior to transmission. Moreover, different modules to be downloaded could be transmitted over different channels, and the descriptor table could include an identifier indicating where the downloadable module could be found. An authentication function can be provided in each terminal to ensure that only authenticated modules are downloaded into the terminal. Finally, although the invention has application to cable television networks, the term "network" is intended to include satellite transmission networks, radio transmission means, and other communication media. It is, therefore, to be understood that within the scope of the appended claims the invention may be practiced otherwise than as specifically described.

What is claimed is:

1. A system for downloading information, comprising:
   a downloading source comprising a plurality of different modules each corresponding to a different set of terminal compatibility requirements which must be satisfied in order for the module to be downloaded by a terminal, a module descriptor table comprising a plurality of comparison indicators and a plurality of operators, each comparison indicator comprising an operator selected from the set consisting of "equal to", "greater than or equal to", and "don't care" and which associates each of the plurality of different modules with a set of descriptors which describe the different set of compatibility requirements, and means for transmitting the module descriptor table and the plurality of different modules over a network; and a plurality of terminals each configured to receive the module descriptor table and the plurality of different modules transmitted from the downloading source, each terminal comprising means for extracting one or more sets of descriptors from the module descriptor table, finding a match between the one or more sets of descriptors and a terminal table which defines compatibility interfaces of the terminal, and downloading one of the plurality of modules associated with the matched set of descriptors;

wherein each terminal finds the match by applying one of the comparison indicators to one of the plurality of descriptors and to an entry in the terminal table.

2. The system of claim 1, wherein at least one of the plurality of different modules is compatible with one of the plurality of terminals but is not compatible with the others.

3. The system of claim 1, wherein each of the plurality of different modules comprises a different version of a common application program which is to be executed in one or more of the plurality of terminals.

4. The system of claim 1, wherein each of the plurality of different modules comprises a different version of a common operating system which is to be executed in one or more of the plurality of terminals.

5. The system of claim 1, wherein the transmitting source comprises a headend in a cable television network including means for broadcasting the module descriptor table over the cable television network, and wherein each of the plurality of terminals comprises a home communications terminal (HCT) coupled to the cable television network.

6. The system of claim 1, wherein one of the descriptors in the module descriptor table indicates a terminal hardware manufacturer in relation to an entry in the terminal table of each of the plurality of terminals.

7. The system of claim 1, wherein one of the descriptors in the module descriptor table indicates an operating system version number in relation to an entry in the terminal table of each of the plurality of terminals.

8. The system of claim 1, wherein one of the descriptors in the module descriptor table indicates an amount of memory in relation to an entry in the terminal table of each of the plurality of terminals.

9. The system of claim 1, wherein at least one of the plurality of terminals extracts the transmitted module descriptor table after booting up and, responsive to a determination that a more recent version of an operating system is included in the transmitted module descriptor table, downloads one of the plurality of modules corresponding to the more recent version of the operating system.

10. The system of claim 1, wherein the terminal table comprises a first entry indicating the hardware model number of the terminal and a second entry indicating the operating system version number of the terminal, and wherein each of the plurality of terminals compares descriptors from the transmitted module descriptor table with the first and second entries to find the match.

11. The system of claim 1, wherein each of the plurality of terminals extracts one or more sets of descriptors from the module descriptor table in response to selection of an application program at the terminal.

12. A terminal compatible with a broadcast network, comprising:

a terminal table comprising one or more fields which define compatibility interfaces of the terminal;

means for receiving from the network a table of entries comprising a plurality of comparison indicators, and a plurality of operators, each comparison indicator comprising an operator selected from the set consisting of "equal to", "greater than or equal to", and "don't care" and each of which associates one of a plurality of downloadable modules with a plurality of terminal compatibility interfaces, comparing one of the fields in the terminal table with one of the entries in the table received from the network and, responsive to a determination that a match of one of the comparison indicators to one of the fields in the terminal table and to one of the entries in the received table exists, downloading the one downloadable module corresponding to the matched entry.

13. The terminal according to claim 12, wherein the one or more fields of the terminal table comprise a hardware manufacturer model number and an operating system version number.

14. The terminal according to claim 12, wherein the one or more fields of the terminal table comprise a memory capacity of the terminal.

15. The terminal according to claim 12, wherein the terminal comprises a home communication terminal (HCT) which is compatible with a subscription television network, and wherein the terminal downloads the one downloadable module over the subscription television network.

16. The terminal according to claim 12, wherein the terminal receives the transmitted table after booting up and, responsive to a determination that a more recent version of an operating system is included in the received table, downloads one of the plurality of modules corresponding to the more recent version of the operating system.

17. The terminal according the claim 12, wherein the downloaded module comprises an application program which is subsequently executed in the terminal.

18. The terminal according to claim 12, wherein the terminal downloads the one downloadable module corresponding to the matched entry from a location determined by data contained in the table of entries received from the network.

* * * * *

UNITED STATES PATENT AND TRADEMARK OFFICE
CERTIFICATE OF CORRECTION

PATENT NO. : 6,487,723 B1
DATED : November 26, 2002
INVENTOR(S) : Macinnis, A. G.

It is certified that error appears in the above-identified patent and that said Letters Patent is hereby corrected as shown below:

Title page,
Item [73], Assignee, delete "Scientific-Atlanta, Inc., Lawrenceville, GA (US)" and insert therefore -- PowerTV, Inc., Cupertino, CA (US) --

Column 8,
Line 45, delete "a periodically" and insert therefore -- aperiodically --

Column 10,
Line 51, delete "the" between "according" and "claim" and insert therefore -- to --

Signed and Sealed this

Eleventh Day of March, 2003

JAMES E. ROGAN
*Director of the United States Patent and Trademark Office*